United States Patent [19]

Katakabe et al.

[11] Patent Number: 4,743,976
[45] Date of Patent: May 10, 1988

[54] IMAGE READ APPARATUS WITH RECIPROCATING DOCUMENT PLACING PLATE

[75] Inventors: Noboru Katakabe, Uji; Yuji Nakamura; Atsushi Sogami, both of Hirakata; Yoshio Horiike, Katano, all of Japan

[73] Assignee: Matsushita Electric Industrial Co., Ltd., Osaka, Japan

[21] Appl. No.: 845,119

[22] Filed: Mar. 27, 1986

[30] Foreign Application Priority Data

Mar. 29, 1985 [JP] Japan ................ 60-63408
Mar. 29, 1985 [JP] Japan ................ 60-63409

[51] Int. Cl.$^4$ ............... H04N 1/12; H04N 1/04; H04N 1/10
[52] U.S. Cl. ................ 358/293; 358/285; 358/296
[58] Field of Search .......... 358/302, 296, 298, 285, 358/293, 294

[56] References Cited

U.S. PATENT DOCUMENTS

| | | | |
|---|---|---|---|
| 3,592,963 | 7/1971 | Young | 358/293 |
| 4,049,255 | 9/1977 | Stange et al. | 271/3 |
| 4,412,734 | 11/1983 | Shibuya et al. | 355/3 SH |
| 4,447,832 | 5/1984 | Kurata et al. | 358/293 |
| 4,476,496 | 10/1984 | Thaler | 358/293 |
| 4,598,323 | 7/1986 | Honjo et al. | 358/293 |

FOREIGN PATENT DOCUMENTS

| | | |
|---|---|---|
| 1814089 | 8/1969 | Fed. Rep. of Germany. |
| 125161 | 7/1984 | Japan. |
| 18055 | 1/1985 | Japan ............ 358/293 |
| 2088833 | 6/1982 | United Kingdom. |

Primary Examiner—James J. Groody
Assistant Examiner—Randall S. Svihla
Attorney, Agent, or Firm—Wenderoth, Lind & Ponack

[57] ABSTRACT

An image read apparatus for reading an image on a document which includes a reciprocatively movable document placing plate for placing thereon the document, a document placing plate driving mechanism for driving the document placing plate and an image reader for reading the image information on the document. The document placing plate is movable reciprocatively between a first position where the document placing plate is housed completely in the image read apparatus and a second position where the document placing plate projects outwardly from the image read apparatus to thereby enable the document to be placed thereon. The image read apparatus sequentially reads the image information on the document between each sequential movement of the document placing plate from the second position to the first position. Preferably, a document holding member such as a flexible sheet or an endless belt is provided for pressing the document onto the document placing plate within the image read apparatus.

17 Claims, 4 Drawing Sheets

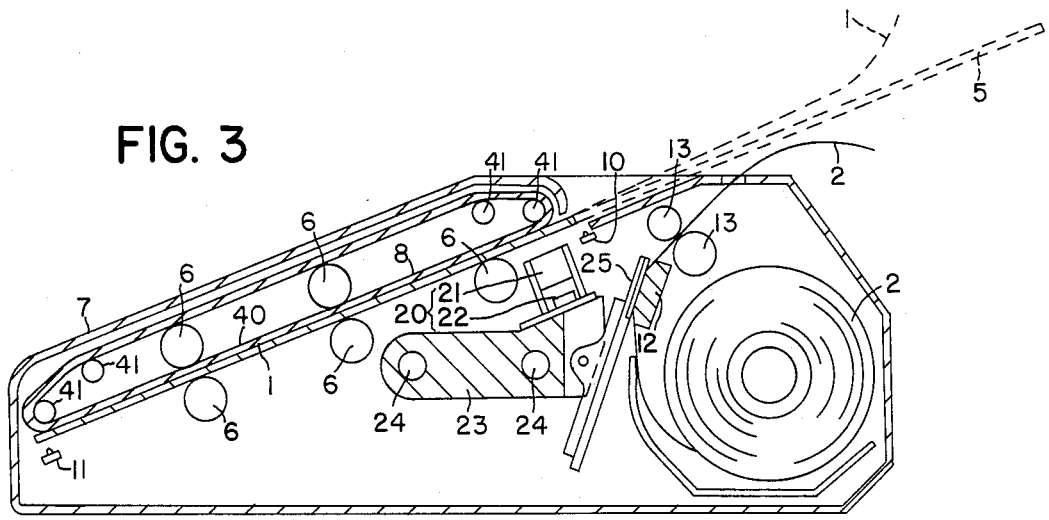
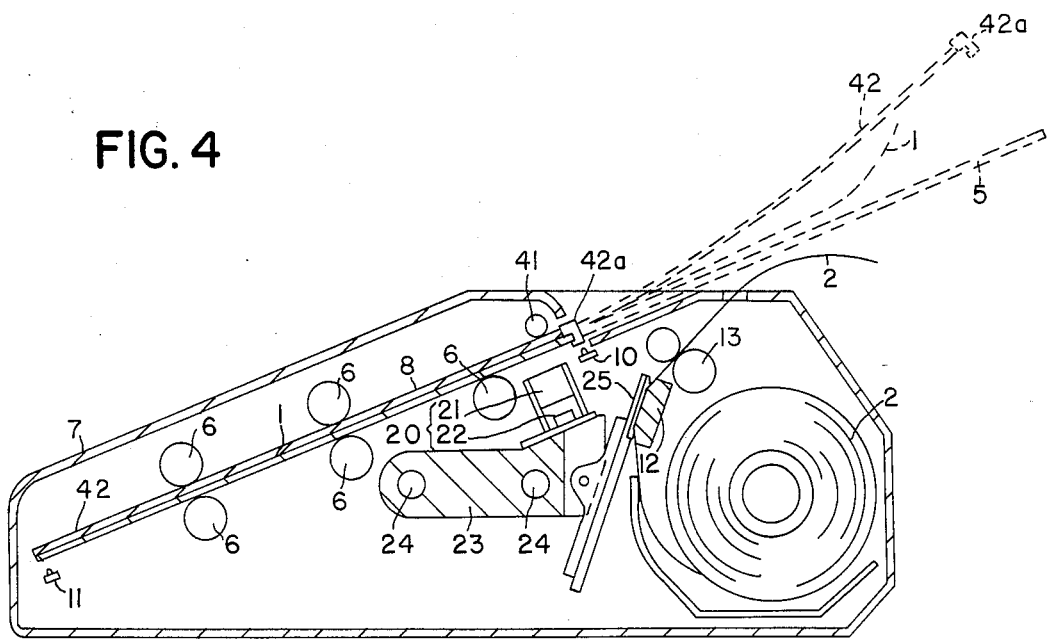

IMAGE READ APPARATUS WITH RECIPROCATING DOCUMENT PLACING PLATE

BACKGROUND OF THE INVENTION

1. Field of the Invention

The present invention relates to an image read apparatus, such as a facsimile apparatus or a copier, which functions to read images on a document for copying or transmitting (to remote equipment) them.

2. Description of the Prior Art

Recently, the facsimile apparatus or the copier, has been widely popularized and a more small-sized, inexpensive and easy-to-handle one has recently been demanded. A small-sized and easy-to-handle facsimile apparatus has been proposed in Japanese Kokai No. 59-125161.

FIG. 5 is a sectional view exemplary of the conventional facsimile apparatus, in which reference numeral 50 designates a document to be transmitted, 51 designates document feeding rollers, 52 designates a platen, 53 designates a luminous source, 54 designates a mirror, 55 designates a lens, 56 designates an image sensor for reading an image on the document, 57 designates a heat-sensitive recording paper, 58 designates a thermal head, 59 designates a platen, and 60 designates a roller for feeding the recording paper. The document 50 is fed sequentially by the rollers 51, when the luminous source 53 and image sensor 56 each operate to scan the document 50 to thereby conduct image transmitting operation. After completion of the transmitting operation, the document 50 is discharged to a document receiving tray 61.

This construction, however, is liable to cause trouble such as winding the document onto the roller 51, or clogging the feeding mechanism of the apparatus with the document during feeding of the document. Also, a problem is created in that especially a small-sized paper sheet cannot be fed as the document, and that a document, when intended to be repeatedly read, must be manually reset from the tray 61 to the inserting position.

SUMMARY OF THE INVENTION

An object of the present invention is to provide a small-sized, inexpensive and easy-to-handle image read apparatus, free from the above problems.

Another object of the present invention is to provide a small-sized, inexpensive and easy-to-handle facsimile apparatus, free from the above problems.

In order to attain the above objects, the image read apparatus of the invention is provided with a reciprocatively movable document placing plate for placing a document thereon, document placing plate driving means for moving the document placing plate, and image read means for scanning the document surface to read image information therefrom. Furthermore, when the image read apparatus is provided with a transmission means for transmitting the read image information, a facsimile apparatus is realized.

The present invention constructed as above-mentioned does not transport the document directly by feed rollers, but instead, holds it on the document placing plate and moves the document placing plate. Hence, documents of various sizes, especially those which are small-sized and unable to be fed only by the rollers, can reliable be transported without trouble. Also, a curled document can be transported without being rolled onto a feed roller. Furthermore, the image read apparatus of the invention allows the document to be set with ease on the document placing plate so as to be superior in handling. Also, a document placed on the document placing plate can be repeatedly read by moving the document placing plate reciprocatively. Thus a function of transmitting information on the same document sequentially to several remote stations can be easily provided.

These and other objects and features of the invention will become more apparent from the following detailed description taken in connection with the accompanying drawings in which:

BRIEF DESCRIPTION OF THE DRAWINGS

FIGS. 3 and 4 are schematic side sectional views of modified embodiments of the image read apparatus of the invention.

DESCRIPTION OF THE PREFERRED EMBODIMENTS

Figure 1A:
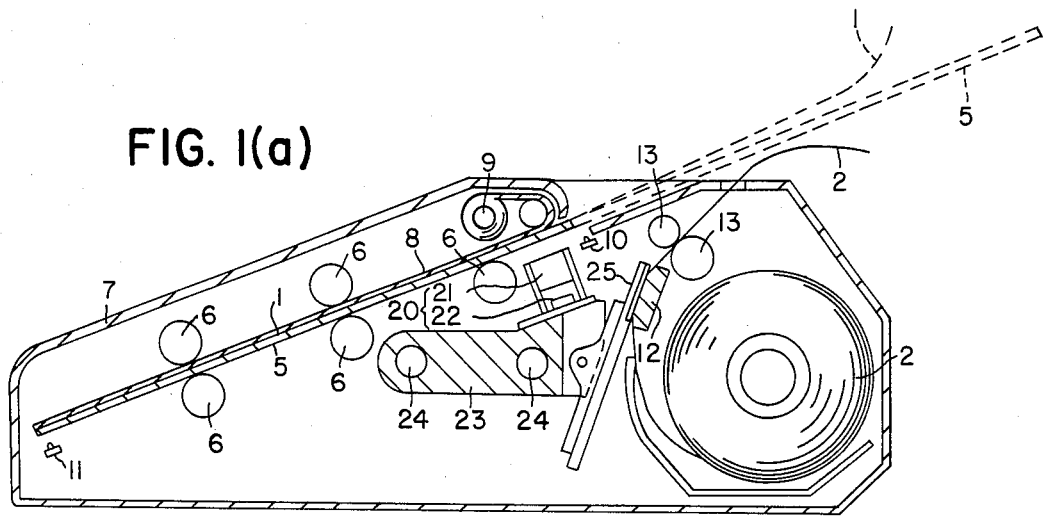
FIG. 1(a) is a schematic side sectional view of an embodiment of an image read apparatus of the invention.
Figure 2:
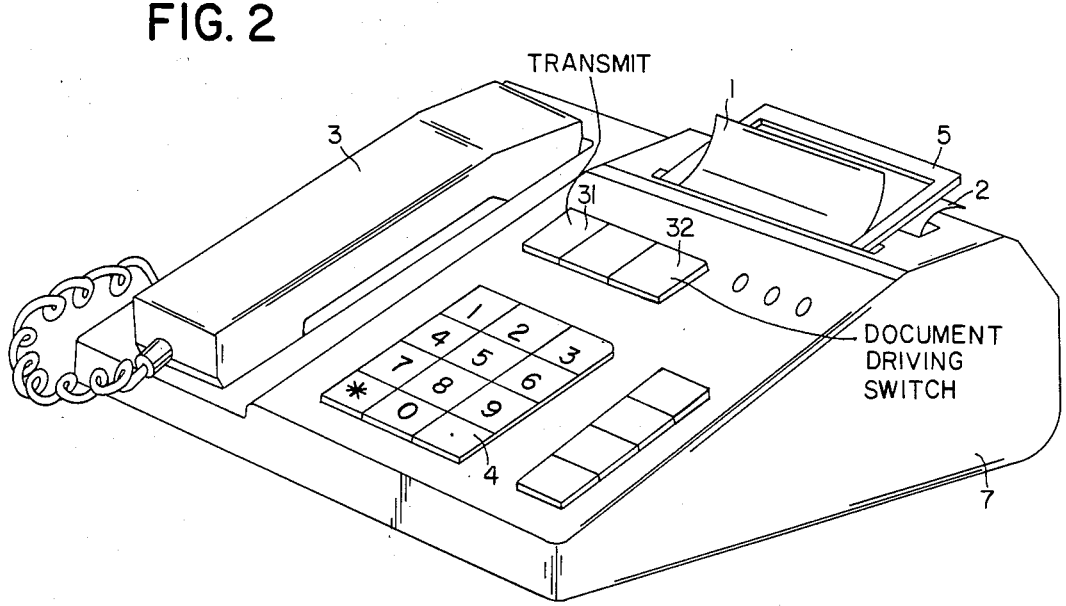
FIG. 2 is a perspective exterior view of the embodiment of FIG. 1(a)
Figure 1B:
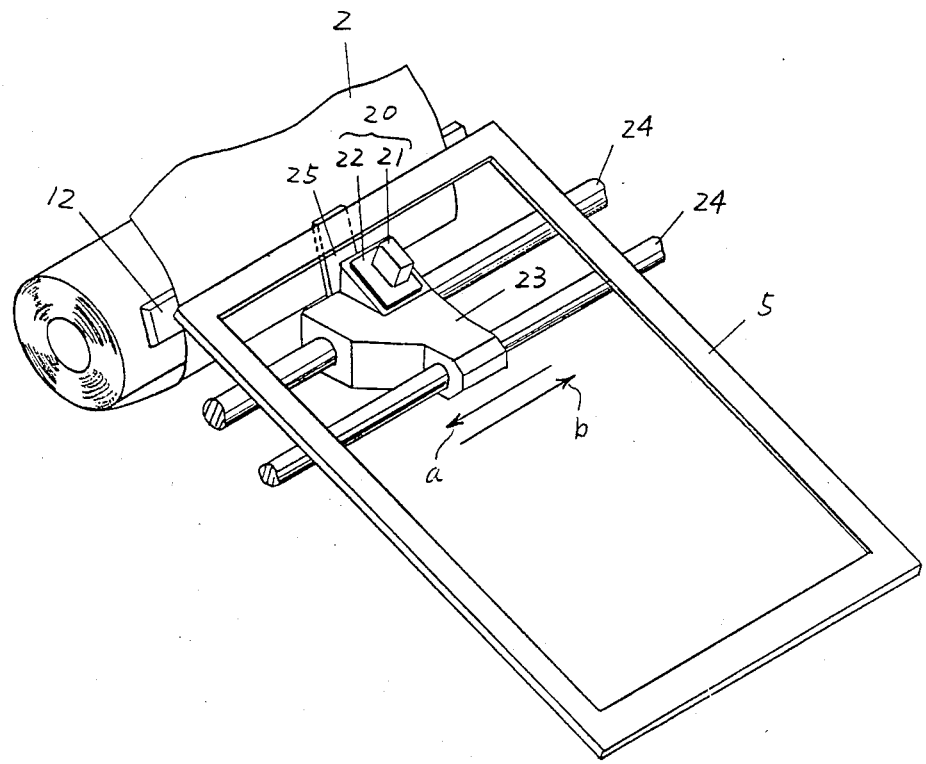
FIG. 1(b) is a perspective view showing a reciprocative carriage used in the embodiment of FIG. 1( a)
Figure 5:
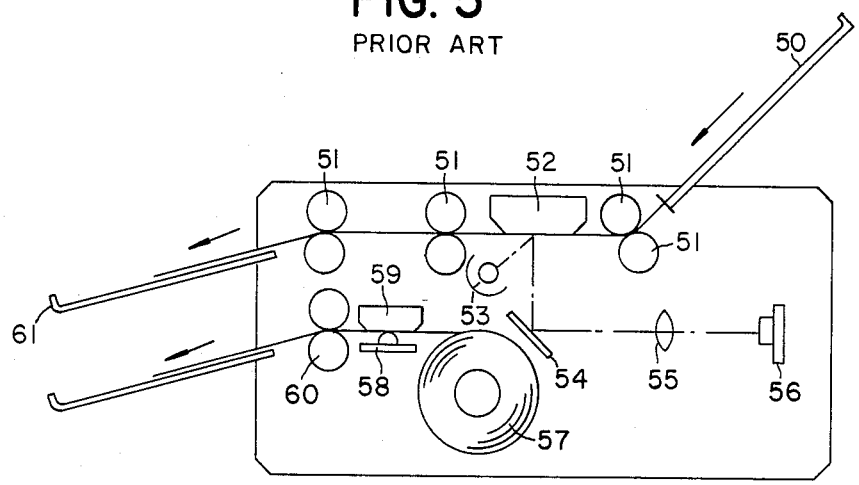
FIG. 5 is a schematic side sectional view of the conventional facsimile apparatus.

FIGS. 1(a), 1(b) and 2 show an embodiment of a facsimile apparatus of the invention, in which reference numeral 1 designates a document to be transmitted, 2 designates a heat-sensitive recording paper, 3 designates a receiver, 4 designates an entry keyboard, and 5 designates a document placing plate for placing thereon the document 1. The document placing plate 5 is adapted to move reciprocatively by driving rollers 6 so that the document 1 can be put into and out of the apparatus between a first position where the document placing plate 5 is housed in an outer case 7 as shown in the solid line in FIG. 1(a) and a second position where the document placing plate 5 is projected out of the outer case 7 as shown in the broken line. Reference numeral 8 designates a document holding sheet provided to bring the document 1 placed on the document placing plate 5 into press-contact therewith on its entire surface. When the document placing plate 5 is projected out of the outer case 7, the document holding sheet 8 is automatically sequentially wound onto a take-up roller 9 and is not taken out of the casing 7. Accordingly, the document 1 is placed on or removed from the document placing plate 5 with ease when the document placing plate 5 is positioned in the second position as shown by the broken line. The document placing plate 5 is made of a transparent material, such as glass or plastic so that an image on the document 1 can be read from below. The document holding sheet 8 is a flexible sheet, such as cloth or thin plastic. Reference numeral 10 designates a document position detection sensor for detecting the existence of the document 1, 11 designates a termination detection sensor for detecting the position of an end of the document placing plate 5 when fully inserted into the case 7, and 20 designates a read sensor unit for reading the image on the document 1. The read sensor unit 20 comprises an optical unit 21 comprising a lens and a luminous source, and an image sensor 22. The read sensor unit 20 is fixed on a carriage 23 and scans the document surface while moving integrally with the carriage 23 perpendicularly to the moving direction of the document placing plate 5, in other words, transversely in directions shown by arrows a and b in FIG. 1(b). The carriage 23 is driven by a carriage driving motor (not shown) to move along guide rods 24. A thermal head 25 which is mounted on the carriage 23 is movable reciprocatively together with the carriage 23 transversely (in the directions a and b in FIG. 1(b)), and adapted to be brought into press-contact with a platen 12 for sequentially recording on the heat-sensitive recording paper 2 a received image as the carriage 23 moves. In addition, reference numeral 13 designates feeding rollers for feeding the heat-sensitive recording paper 2.

The document 1, in a transmitting mode, is set on the document placing plate 5 while keeping its surface to be read facing downwardly, and then a transmit button 31 is pushed. Upon completing the receiving preparation at a remote receiver (not shown), a document driving motor (not shown) immediately starts rotation to rotate the driving rollers 6, thereby transporting into the outer case 7 the document placing plate 5 while supporting thereon the document 1. At this time the document holding sheet 8 is unrolled sequentially from the roller 9 as the document placing plate moves, thereby bringing the document 1 at the entire surface thereof into press-contact with the upper surface of the document placing plate 5. When the document position detection sensor 10 detects the document position, the document placing plate 5 is transported to a position where the utmost end thereof reaches the position above the read sensor unit 20 and then stops there. Upon the stopping of the document placing plate 5, the carriage 23 positioned at the leftmost end of the apparatus is moved by the carriage driving motor (not shown) rightwardly (in the direction b in FIG. 1(b)) at a constant speed, while the read sensor unit 20 scans the document surface to sequentially read the image information. When the carriage 23 reaches the rightmost end and the document surface scanning is once finished, the carriage driving motor reversely rotates to return the carriage 23 toward the leftmost end. In addition, the image information having been read is transmitted sequentially in accordance with a predetermined standard. Then, the document receiving plate driving motor re-rotates simultaneously with the leftward return of the carriage 23 or after the leftward return thereof, for transporting the document placing plate 5 within a predetermined pitch and halting it. Upon halting the document placing plate 5, the carriage 23 is driven again rightwardly and the read sensor unit 20 conducts the read scanning. Thus, the read scanning of the read sensor unit 20 on the document 1 and document placing plate 5 feeding operation are repeated alternately to thereby read the entire document surface. After the document position detection sensor 10 detects the termination of the document 1, when the last read scanning by the read sensor unit 20 is completed, the document placing plate driving motor reversely rotates to move the document placing plate 5 outwardly from the case 7 and discharge it to the external termination position (second position) as shown by the broken line in FIG. 1(a), at which time the document holding sheet 8 is sequentially wound onto the take-up roller 9. Thus, the document 1, when the document placing plate 5 is discharged, can be easily removed therefrom.

Thus, the document reading and transmitting operation of the facsimile apparatus of the invention is completed. When the document placing plate 5 is positioned outside the outer case 7 after completion of the transmitting operation, a document driving switch 32 is pushed so that the document driving motor rotates to continuously retract the document placing plate 5 until it reaches the first position where the termination detection switch 11 is actuated, thereby enabling the document placing plate 5 to be housed in the outer case 7. In addition, the document placing plate driving motor is so controlled that when the document placing plate 5 is housed in the case 7, the document placing plate driving switch 32 is pushed to reversely rotate the document placing plate driving motor, thereby enabling the document placing plate 5 to be continuously discharged to the external termination position shown by the broken line in FIG. 1(a). Also, a document placing plate driving mechanism including the driving motor and driving rollers 6 operates at the speed of two stages—when the document placing plate 5 is operated intermittently by the predetermined pitch for reading the document, the motor is driven at a low speed, and when the document placing plate 5 is continuously operated but not for reading the document, the motor is driven at a high speed.

In a receiving mode, the thermal head 25 comes into press-contact with the platen 12 while putting therebetween the heat-sensitive recording paper 2 and moves rightwardly with respect to the front of the apparatus, thereby sequentially recording a received image. When the carriage 23 reaches the rightmost end after completion of the image recording on one line, the thermal head 25 leaves the heat-sensitive recording paper 2 and the carriage 23 is returned leftwardly, at which time the heat-sensitive recording paper 2 is fed only by a predetermined pitch through the feed rollers 13. Thus, the thermal head 25 and heat-sensitive recording paper 2 alternately repeat the operations thereof to sequentially conduct the recording, and stop after the finish of recording to an extent of the input.

FIGS. 3 and 4 show modified embodiments of the image read apparatus of the invention.

In FIG. 3, reference numeral 40 designates an endless belt serving as a document holder, and 41 designates guide rollers for guiding the belt 40. The belt 40 is driven by driving rollers 6 and normally or reversely rotating along a predetermined travelling path to function as the same as the document holding sheet 8 in FIG. 1(a) so as to press the document 1 at its entire surface onto the document placing plate 5, thereby bringing the document into close contact therewith. The belt 40, driving rollers 6 and guide rollers 41 are friction-coupled with each other, but may of course be desirably coupled by means of, for example, gear coupling.

In FIG. 4, reference numeral 42 designates a document holding sheet, and 41 designates a guide roller for guiding the sheet 42. The sheet 42 is fixed at one end to the utmost end of the document placing plate 5 and has at the other end a lock member 42a which can be detachably mounted on the rear end of the document placing plate 5, thereby being adapted to move integrally therewith. When the document 1 is set on the document placing plate 5, an operator manually removes the lock member 42a from the document placing plate 5 to raise the sheet 42. After the document 1 is placed on the document placing plate 5, the sheet 42 covers the document 1, and then the lock member 42a is hooked on the document placing plate 5. In addition, the sheet 42, which is locked by the lock member 42a herein, may alternatively be attached merely with a weight instead of the lock member 42a, so that the weight may merely be put on the document placing plate 5.

The aforesaid several embodiments have been described to provide easy understanding of the invention, but the invention is not limited to these embodiments only. The image read apparatus of the present invention is applicable not only to the facsimile apparatus but also to other various image processing apparatus, such as a copier or an input/output terminal for a computer.

Although the invention has been described with reference to several different embodiments, these embodiments are merely exemplary and not limiting of the invention which is defined solely by the appended claims.

What is claimed is:

1. An image read apparatus comprising:
   a document placing plate for placing thereon a document and movable reciprocatively, said document placing plate being movable reciprocatively between a second position at which said document placing plate projects outwardly from said image read apparatus to thereby enable said document to be placed thereon and a first position at which said document placing plate is housed completely within said image read apparatus;
   document placing plate driving means for moving said document placing plate; and
   image read means for reading image information on said document.

2. An image read apparatus as set forth in claim 1, wherein said document placing plate driving means is adapted to move said document placing plate from said second position to said first position in synchronism with an image information read operation of said image read means.

3. An image read apparatus comprising:
   a document placing plate for placing thereon a document and movable reciprocatively;
   document holding means for causing said document to be pressed over its entire surface onto said document placing plate, said document holding means comprising a flexible sheet housed within said image read apparatus;
   document placing plate driving means for moving said document placing plate; and
   image read means for reading image information on said document.

4. An image read apparatus comprising:
   a document placing plate for placing thereon a document and movable reciprocatively;
   document holding means for causing said document to be pressed over its entire surface onto said document placing plate;
   document placing plate driving means for moving said document placing plate; and
   image read means for reading image information on said document;
   wherein said document holding means comprises an endless belt capable of movement together with said document placing plate during movement of said document placing plate.

5. An image read apparatus comprising:
   a document placing plate movable between a second position at which said document placing plate projects outwardly from said image read apparatus to thereby enable a document to be placed thereon and a first position at which said document placing plate is housed completely within said image read apparatus;
   document holding means for pressing said document placed on said document placing plate over its entire surface onto said document placing plate;
   document placing plate driving means for moving said document placing plate; and
   image read means for reading image information on said document.

6. An image read apparatus as set forth in claim 5, wherein said document holding means comprises a flexible sheet;

7. An image read apparatus as set forth in claim 6, wherein said flexible sheet is housed within said image read apparatus and is adapted to press said document onto said document placing plate as said document receiving plate moves from said second position to said first position.

8. An image read apparatus as set forth in claim 5, wherein said document holding means comprises a flexible sheet fixed at one end thereof to one end of said document placing plate, and a take-up roller for winding thereon said flexible sheet from the other end thereof, so that when said document placing plate moves from said second position to said first position said sheet is unwound sequentially from said take-up roller so as to press said document onto said document placing plate, and when said document placing plate moves from said first position to said second position said sheet is wound sequentially onto said take-up roller.

9. An image read apparatus as set forth in claim 5, wherein said document holding means comprises a flexible sheet having one end which is fixed to one end of said document placing plate and a free end which is mounted detachably on the other end of said document placing plate.

10. An image read apparatus as set forth in claim 5, wherein said document holding means comprises an endless belt capable of movement together with said document placing plate, and guide rollers for guiding said endless belt.

11. An image read apparatus as set forth in claim 5, wherein said document placing plate driving means is adapted to move said document placing plate from said second position to said first position in synchronism with an image information reading operation of said image read means.

12. An image read apparatus comprising:
    an outer case;
    a document placing plate movable between a second position at which said document placing plate is positioned outside of said outer case to enable a document to be placed on said document placing plate and a first position at which said document placing plate is housed within said outer case;
    document placing plate driving means for moving said document placing plate;
    image read means for reading image information on said document;
    carriage means which carries thereon said image read means and is movable reciprocatively along a surface of said document and perpendicularly to the direction in which said document placing plate moves; and
    carriage driving means for driving said carriage means;

wherein when said image read means is executing an image information reading operation, said document placing plate driving means is adapted to transport said document placing plate from said second position to said first position intermittently and in synchronism with the reciprocative movement of said carriage means.

13. An image read apparatus as set forth in claim 12, wherein said document placing plate driving means is adapted to continuously move said document placing plate between said first position and said second position when said image read means is not executing said image information reading operation.

14. An image read apparatus as set forth in claim 12, further comprising switch means for controlling operation of said document placing plate driving means to move said document placing plate continuously to said second position.

15. A facsimile apparatus comprising:
a document placing plate which moves reciprocatively and on which a document having image information to be transmitted is placed;
document placing plate driving means for moving said document placing plate;
image read means which scans the surface of said document and reads the image information thereon;
transmission means for transmitting the read image information; and
a document holding member with which said document placed on said document placing plate is pressed over its entire surface onto said document placing plate;
wherein said document holding member is formed of a flexible material and is housed within said facsimile apparatus.

16. A facsimile apparatus as set forth in claim 15, further comprising: carriage means carrying thereon said image read means and movable reciprocatively along the surface of said document and perpendicularly to the direction in which said document placing plate moves; carriage driving means for moving said carriage means; and an outer case housing therein said image read means, said carriage means and said carriage driving means; wherein said document placing plate is movable between a second position at which said document placing plate projects outwardly from said outer case to thereby enable said document to be placed thereon and a first position at which said document placing plate is housed completely within said outer case; wherein said document placing plate driving means drives said document placing plate between said first position and said second position intermittently and in synchronism with the reciprocative movement of said carriage means when said image read means is executing an image information reading operation; and wherein said document placing plate driving means drives said document placing plate between said first position and said second position continuously when said image read means is not executing said image information reading operation.

17. A facsimile apparatus as set forth in claim 16, further comprising switch means for controlling operation of said document placing plate driving means to move said document placing plate continuously to said second position.

* * * * *